US012632801B1

(12) United States Patent
Perumal et al.

(10) Patent No.: US 12,632,801 B1
(45) Date of Patent: May 19, 2026

(54) DYNAMIC ADAPTATION OF IDENTITY RELATED USER INTERFACE

(71) Applicant: U.S. Bank National Association, Minneapolis, MN (US)

(72) Inventors: Manohar Perumal, Sugar Hill, GA (US); Russell Dean Brandon, Portland, OR (US); Soma S Nagasundaram, Frisco, TX (US); Sandeep Anand Butapati, Lake Zurich, IL (US); Rachel Yuen Lynn Tan, Jersey City, NJ (US); Arnab Kumar Bhattacharjee, Hillsborough, NJ (US)

(73) Assignee: U.S. Bank National Association

( * ) Notice: Subject to any disclaimer, the term of this patent is extended or adjusted under 35 U.S.C. 154(b) by 0 days.

(21) Appl. No.: 19/081,261

(22) Filed: Mar. 17, 2025

(51) Int. Cl.
　*G06Q 10/02*　　　(2012.01)
　*G06T 11/00*　　　(2006.01)
(52) U.S. Cl.
　CPC .............. *G06Q 10/02* (2013.01); *G06T 11/00* (2013.01); *G06T 2200/24* (2013.01)
(58) Field of Classification Search
　CPC ...... G06Q 10/02; G06T 11/00; G06T 2200/24
　See application file for complete search history.

(56) References Cited

U.S. PATENT DOCUMENTS

| | | | |
|---|---|---|---|
| 8,768,772 | B2 | 7/2014 | Schachter et al. |
| 9,454,619 | B2 | 9/2016 | Butlin et al. |
| 10,176,154 | B2 | 1/2019 | Ben-Aharon et al. |

| | | | |
|---|---|---|---|
| 10,580,165 | B2 | 3/2020 | Sorkine-Hornung et al. |
| 12,229,763 | B1 * | 2/2025 | Collins ................ G06Q 20/388 |
| 2002/0010651 | A1 * | 1/2002 | Cohn ................. G06Q 30/0625 |
| | | | 705/26.44 |
| 2013/0297469 | A1 * | 11/2013 | Spittle .................... G06Q 10/10 |
| | | | 709/219 |
| 2013/0332284 | A1 | 12/2013 | Faith et al. |
| 2018/0301218 | A1 * | 10/2018 | Bochaton .......... G06Q 10/1053 |

(Continued)

FOREIGN PATENT DOCUMENTS

CA　　　3234884 A1　　7/2019

OTHER PUBLICATIONS

Geofli, Easily Replace Website Content Based on Visitor Geo, Jan. 28, 2025, https://www.geofli.com/.

(Continued)

*Primary Examiner* — Sherrod L Keaton
(74) *Attorney, Agent, or Firm* — Garg Law Firm, PLLC; Rakesh Garg; Chris Ziolkowski

(57) ABSTRACT

An embodiment computes an Account Booking Location (ABL) from a login request to access an account of a first user, wherein the ABL corresponds to an asset of a partner entity that initiated the account. The embodiment pushes from a repository to a cache for a UI rendering, a UI element corresponding to the ABL. The embodiment causes a rendering service to compose a rendering instruction using the cached data such that the rendering instruction causes a first brand-specific UI to be rendered on a device associated with the first user. When a second login request from a second user also corresponds to the ABL, the embodiment reuses the cached data to compose a second rendering instruction such that the second rendering instruction causes the first brand-specific UI to be rendered on a second device associated with the second user.

20 Claims, 12 Drawing Sheets

(56)         References Cited

U.S. PATENT DOCUMENTS

2018/0322536 A1    11/2018  Zhang et al.
2020/0097995 A1 *   3/2020  Bissland ............ G06Q 30/0271
2022/0091726 A1     3/2022  Azmoon et al.
2023/0007075 A1     1/2023  Mcphee et al.

OTHER PUBLICATIONS

Singh, Future trends in UI/UX design, Jul. 30, 2024, https://www.smartdatainc.com/smartians-speak/future-trends-in-ui-ux-design/.

* cited by examiner

*Fig. 9*

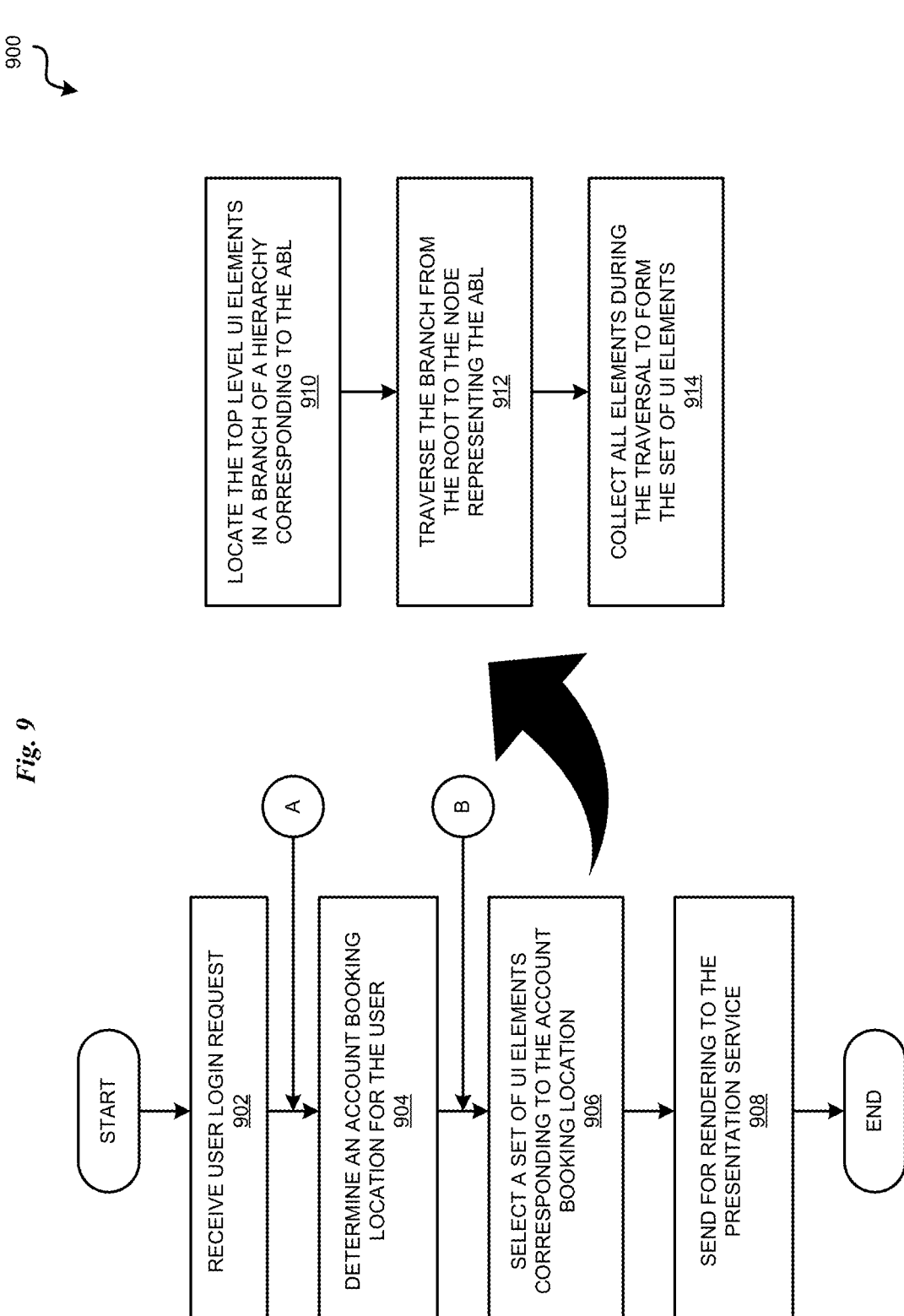

LOCATE THE TOP LEVEL UI ELEMENTS IN A BRANCH OF A HIERARCHY CORRESPONDING TO THE ABL
910

TRAVERSE THE BRANCH FROM THE ROOT TO THE NODE REPRESENTING THE ABL
912

COLLECT ALL ELEMENTS DURING THE TRAVERSAL TO FORM THE SET OF UI ELEMENTS
914

START

RECEIVE USER LOGIN REQUEST
902

DETERMINE AN ACCOUNT BOOKING LOCATION FOR THE USER
904

SELECT A SET OF UI ELEMENTS CORRESPONDING TO THE ACCOUNT BOOKING LOCATION
906

SEND FOR RENDERING TO THE PRESENTATION SERVICE
908

END

A

B

900

1000

START

PRESENT A UI BASED ON A FIRST USER'S ABL
1002

RECEIVE A SECOND LOGIN REQUEST FROM A SECOND USER
1004

IS THE SECOND USER'S ABL THE SAME AS THE FIRST USER'S ABL?
1006

NO → A

YES

IS THE CACHE STILL VALID FOR THE ABL?
1008

NO → B

YES

PRESENT A UI USING THE CACHED UI ELEMENTS FOR THE ABL
1010

END

*Fig. 11*
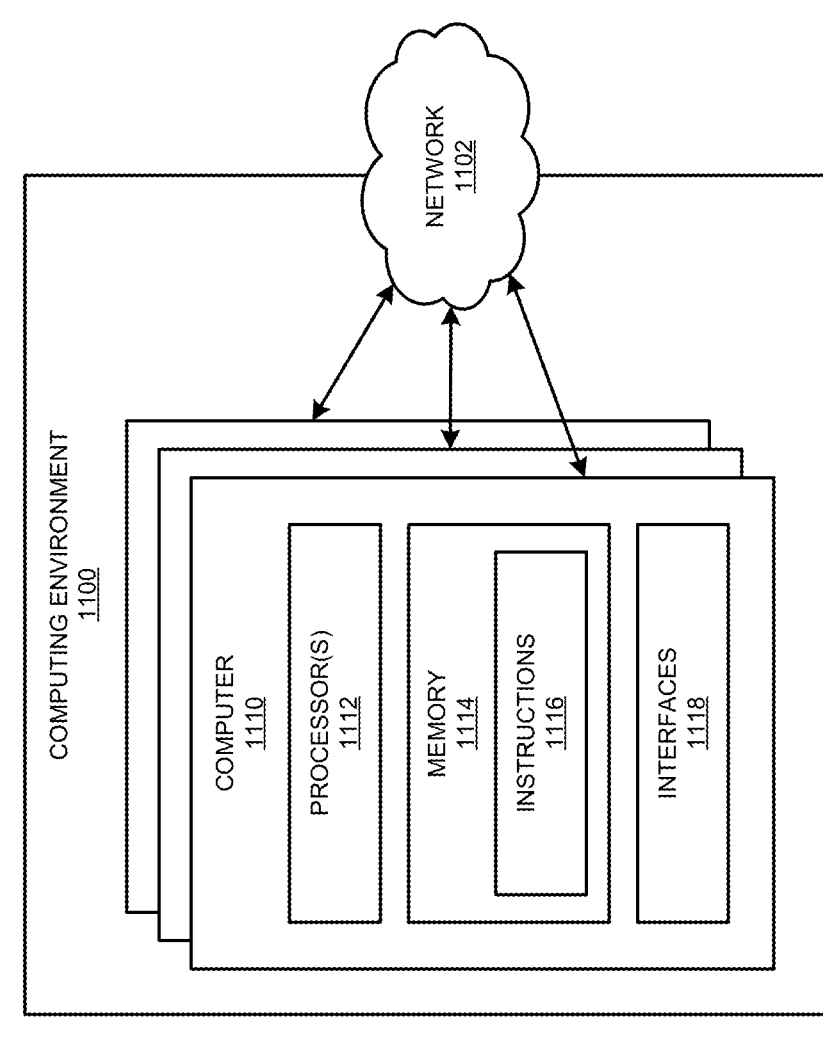

DYNAMIC ADAPTATION OF IDENTITY RELATED USER INTERFACE

BACKGROUND

User Interface (UI) refers to the visual elements of a product (e.g., a physical or virtual product, such as an application ("app") or system with which one or more users interact in or with a computing environment. Typically, a UI includes UI components (components or elements), such as buttons, icons, menus, text fields, and many other types of components that facilitate user interaction and information presentation. Thus, a UI can include components both for receiving input from a user and for providing output to the user. In some instances, a single component can both provide information to a user and receive input. UI is primarily concerned with how the user interacts with a software or system, and designing a UI involves designing these components to be functional and visually appealing.

User experience (UX) is the overall experience a user has when using a UI, especially in terms of how easy or satisfying the UI is to use. UX can be described in terms of single UI components, the overall experience of interacting with an entire UI, or the overall experience of using a product or system to achieve a task. UX encompasses everything from the usability and accessibility of a system to the emotions a user feels when interacting with the UI. Where UI is concerned with the visual design of a website, page, or screen of a software, UX is concerned more with how the UI works, how intuitive the flow and function implemented by the UI feels, how efficiently tasks can be completed using the UI, and how enjoyable the process is to a user. A product or system having an improved UI or a UX can result in the product or system having technical advantages over other products or systems lacking such improvements. Such technical advantages can include one or more aspects selected from the group consisting of: improved battery life, lower power consumption, decreased use of processing resources, decreased use of networking resources, improved accessibility, other advantages, or combinations thereof.

In addition to UI components, a UI also includes UI content. UI content includes text, graphics, images, multimedia, or links to these types of data. UI content appears in a user interface to guide users, provide information, and manage or enhance the user's experience within an application or website. Some examples of UI content include textual content, headings & titles, labels, tooltips & hints, error messages, notifications & alerts, visual content, icons & graphics, illustrations & images, videos & animations, interactive content, forms & inputs, sliders & carousels, modals & pop-ups, and many others.

One aspect of a UI-UX design is branding. UI content is an important consideration in designing the UX, to ensure that users can recognize the entity they are interacting with via the UI, the relationship they have with the entity, and distinguish the tasks they are performing via the UI. Branding of a UI is the changing, adapting, differentiating, selecting, and presentation of UI elements, UI content, or both, to reflect a name, type, or identity of an entity, or the source or target of the information being exchanged via the UI with an entity that is represented on the UI.

A Content Management System (CMS) is a platform used for creating, managing, and modifying digital content. ADOBE EXPERIENCE MANAGER (AEM) from ADOBE is a CMS solution that manages UI content and other UI assets and streamlines the design workflow for UI-UX developers.

SUMMARY

The present disclosure includes inventive concepts relating generally to generating code for a graphical user interface, such as methods, systems, and computer programs for dynamic adaptation of identity related user interface.

The illustrative embodiments provide for dynamic adaptation of identity related user interface. An embodiment includes computing an Account Booking Location (ABL) from a login request to access an account of a first user, wherein the ABL corresponds to an asset of a partner entity that initiated the account. The embodiment further includes pushing from a repository to a cache to form cached data, on demand for a UI rendering responsive to the request, a UI element corresponding to the ABL. The embodiment further includes causing, responsive to the pushing, a rendering service to compose a rendering instruction using the cached data such that the rendering instruction causes a first brand-specific UI to be rendered on a device associated with the first user. The embodiment further includes reusing, responsive to a second login request from a second user wherein the second login request also corresponds to the ABL, the cached data to compose a second rendering instruction such that the second rendering instruction causes the first brand-specific UI to be rendered on a second device associated with the second user. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

At least some novel features believed characteristic of examples of inventive concepts disclosed herein are set forth in the appended claims. The inventive concepts of the instant application, however, as well as a preferred mode of use, further objectives, and advantages thereof, will best be understood by reference to the following detailed description of the illustrative embodiments when read in conjunction with the accompanying drawings, wherein:

US 12,632,801 B1

Figure 5:
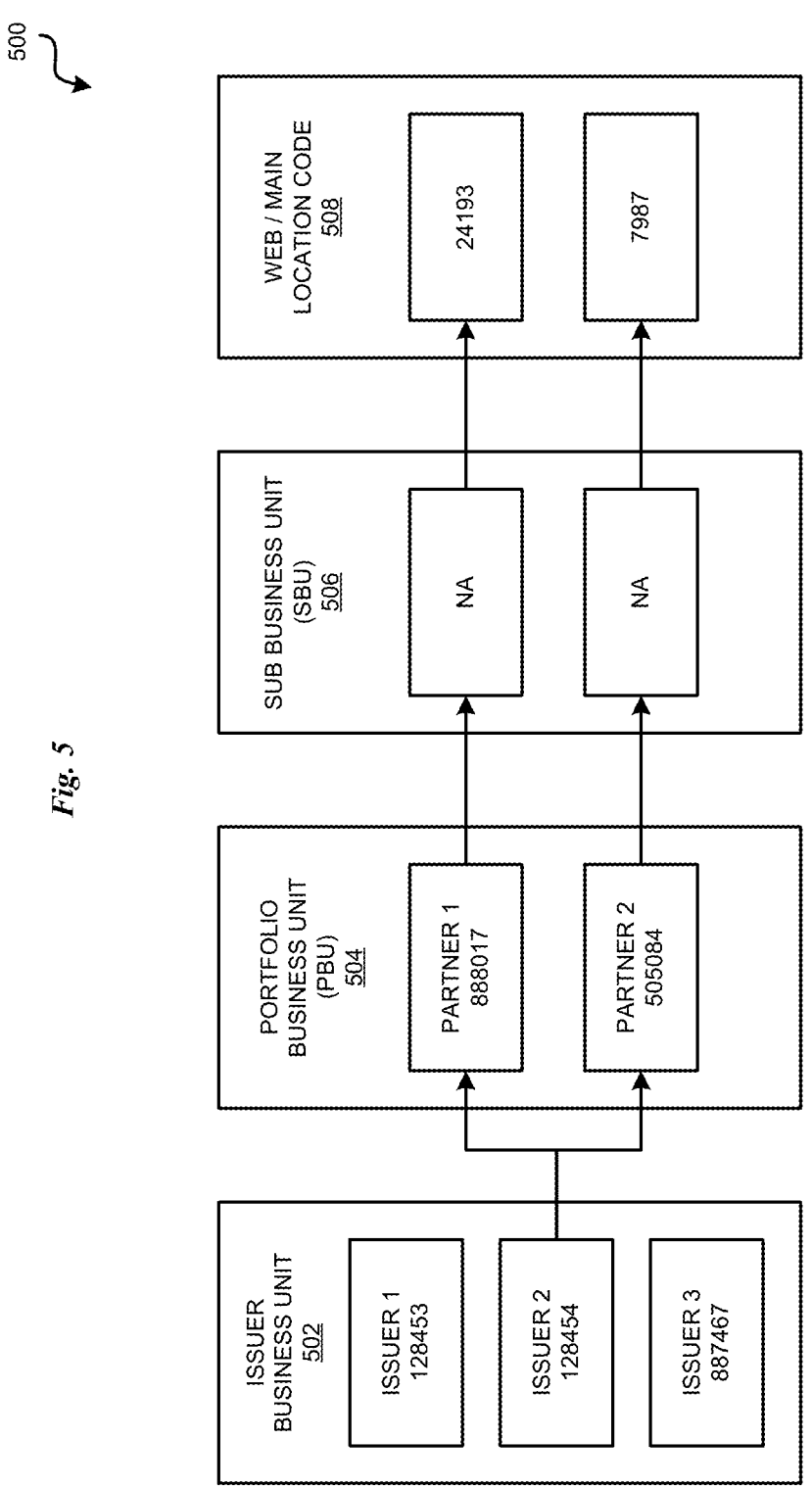
Figure 6:
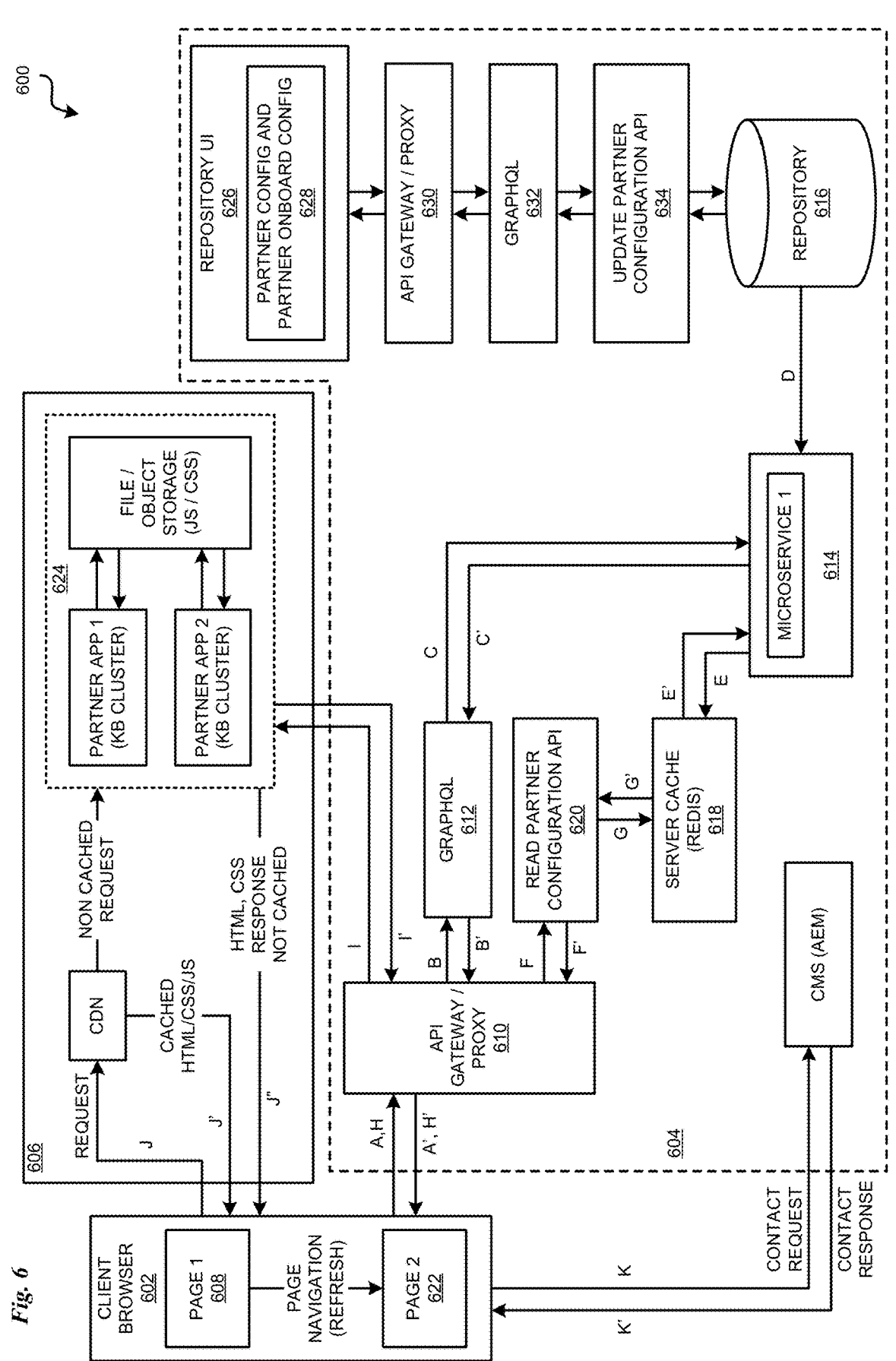
Figure 7:
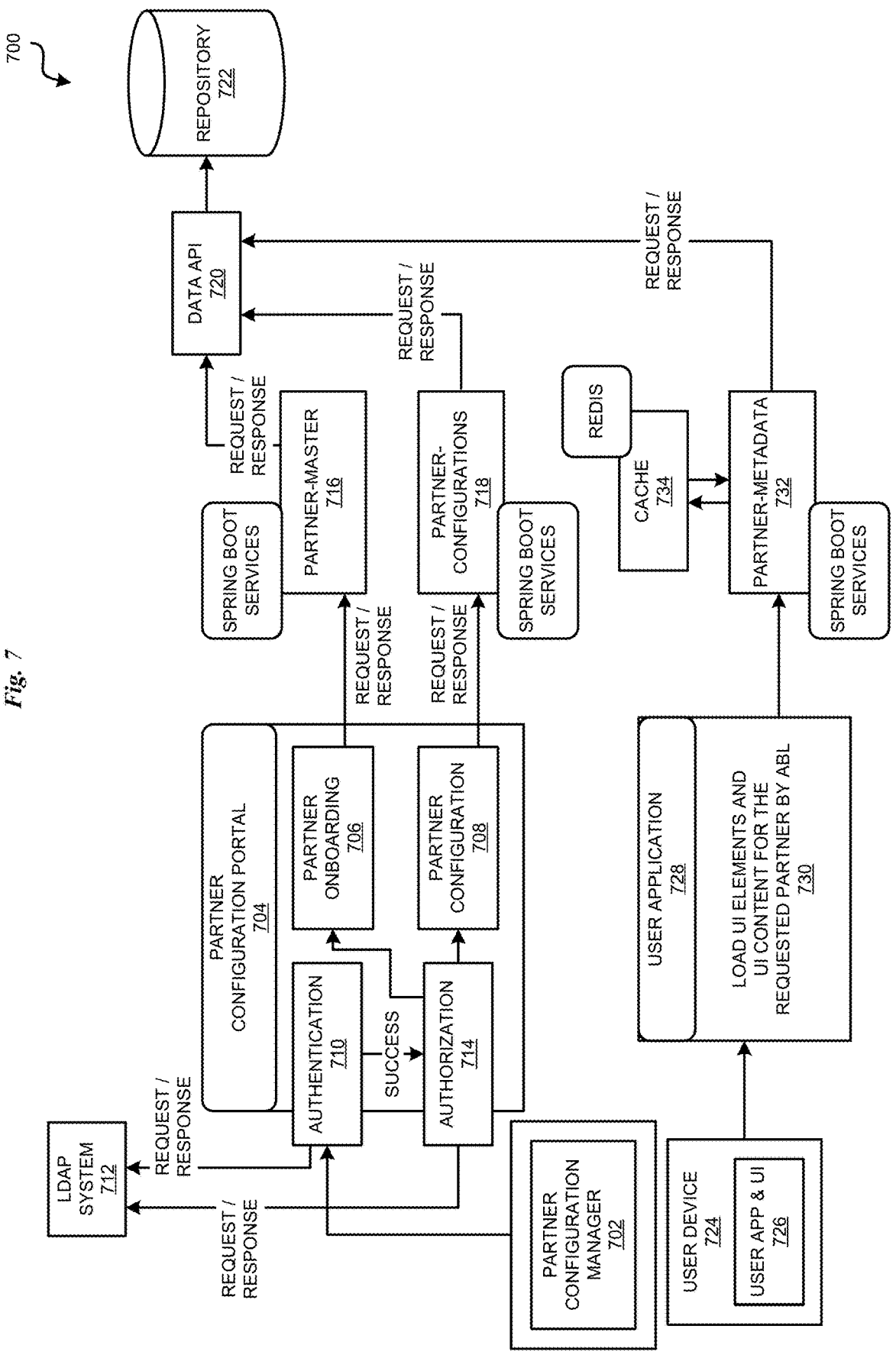
Figure 8A:
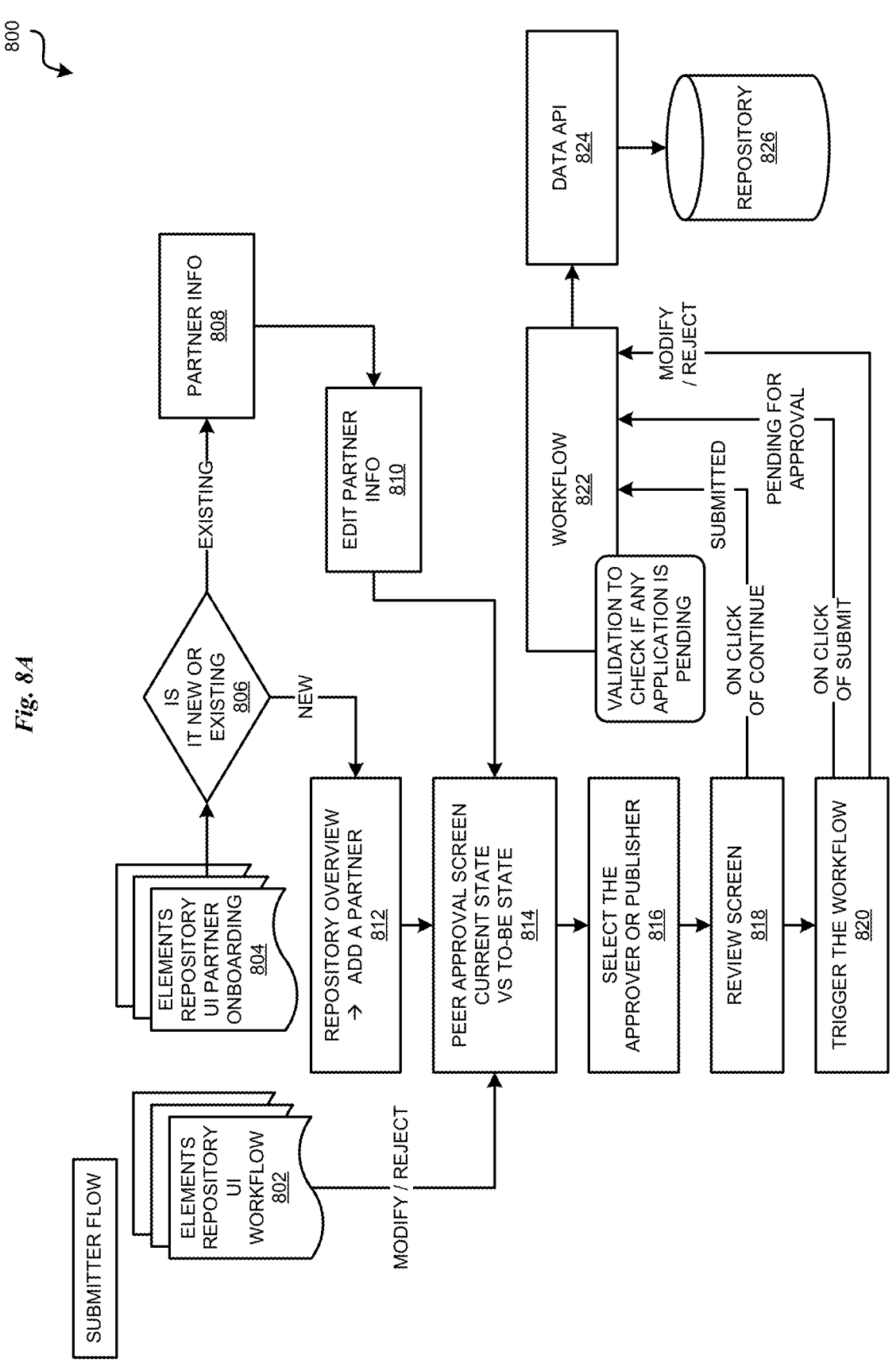
Figure 8B:
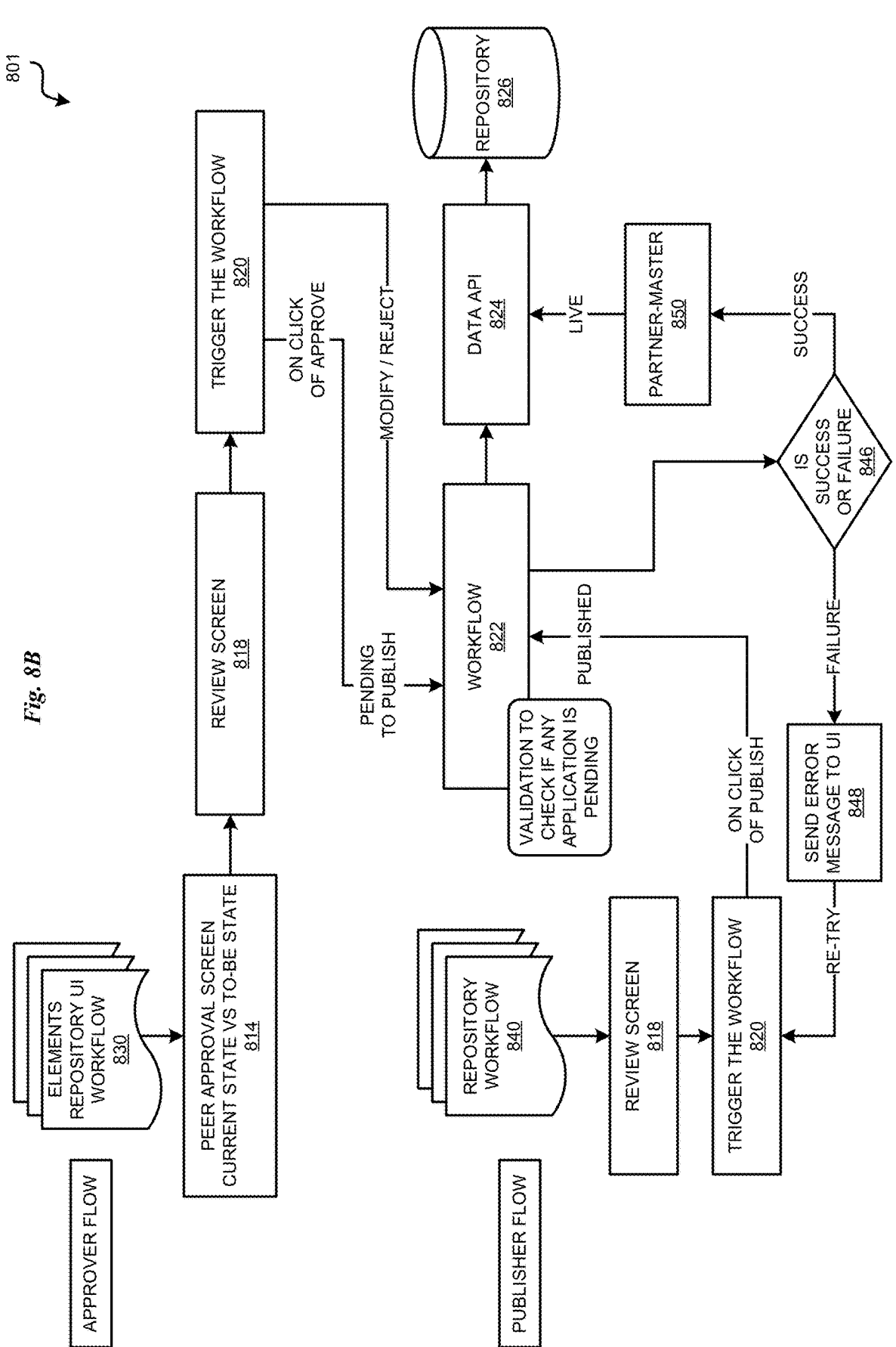
Figure 10:

3 for dynamic adaptation of identity related user interface in accordance with an illustrative embodiment;

FIG. 5 depicts a block diagram of an ABL identification process in an example implementation of an illustrative embodiment;

FIG. 6 depicts a block diagram of an overall process flow for dynamic adaptation of identity related user interface in accordance with an illustrative embodiment;

FIG. 7 depicts another view of an overall process for dynamic adaptation of identity related user interface in accordance with an illustrative embodiment;

FIG. 8A depicts one part of a workflow in a service provider environment in accordance with an illustrative embodiment;

FIG. 8B depicts another part of a workflow in a service provider environment in accordance with an illustrative embodiment;

FIG. 9 depicts a flowchart of an ABL-based dynamic adaptation of identity related user interface in accordance with an illustrative embodiment;

FIG. 10 depicts a flowchart of a process for reusing UI elements and components for different users in accordance with an illustrative embodiment; and FIG. 11 depicts a data processing environment 20 in which aspects of the present disclosure may be implemented.

DETAILED DESCRIPTION

As an example, consider an application a user uses to interact with a financial institution. As with many enterprises, the institution with whom the user has a relationship may be a part of a group of institutions, which in turn may be a part of or related to a larger group, and so on, eventually being served by a common back-end service provider entity that serves and manages the application that the user is using. For example, the service provider may be a major servicer bank and the financial institution may be a regional institution and a partner with the major servicer bank. The partner may be a member of a group of partners the service provider manages, for example, a group of regional banks, a group of credit unions, a group of captive financial divisions of other organizations, and so on. Several groups of partners may be further grouped by the service provider based on some commonality, for example, for providing similar types of service-such as credit card services, personal lending services, commercial loans, and so on, for being located in a common geography-such as by being located in the southwest region or the northeast region (of a country, state, or province), or by some other common characteristic of the groups.

The service provider maintains a partner configuration for each partner. A partner configuration includes partner identity-related (branding related) UI elements, UI content, or both, such as colors, fonts, logos, headings, titles, tag lines, service or feature names, and many other such UI artifacts. The partner configuration also includes data that drives certain UI elements and UI content, such as content file path, logo file path, domain, and privacy policy text, and versions thereof. When a user uses the service provider's application to interact with a specific partner of the service provider, the server-side architecture of the service provider delivers this type of partner configuration data via an Application Programming Interface (API) to instruct the front-end layer of the architecture to render the appropriate user interface presentation that is suitably branded according to the partner.

A partner management system at the service provider manages the branding-related information pertaining to partner configuration (partner information) in a hierarchical data repository. The partner management system organizes the partner information, information pertaining to branding-related configuration information of group(s) to which the partner belongs-including branding-related configuration information pertaining to higher level groups (collectively referred to as "partner group information"), in a hierarchical manner. the hierarchy is organized in this manner starting at the root node of the service provider's own branding-related configuration information down to super groups, smaller groups, and so on, until the leaf node of the specific partner's specific Account Booking Location (ABL).

An ABL is a location associated with a presence situs of a partner entity that was instrumental in or responsible for first creating the account that is associated with the user. In one embodiment, the ABL may be geographic-marked by latitude-longitude or a geographical name of a place. In another embodiment the ABL may be virtual-identified by a URL or a portion thereof, a location or address in a data network, or another manner of locating a place in a virtual or online environment. In another embodiment, the ABL may be a name or an identifier given or assigned to an asset of the partner entity. In another embodiment, the ABL may be a value in a proprietary system of asset identification. One non-limiting example of ABL is a name of a branch of a partner regional bank where the branch was responsible for initiating the account of the user. Another non-limiting example of ABL is an alphanumeric tag or code associated with a virtual location a partner regional bank's website where the account of the user was initiated using the resources available at that virtual location. From this disclosure, those of ordinary skill in the art will be able to conceive many other examples and variants of ABL and the same are contemplated within the scope of the illustrative embodiments.

As an example, a node in the hierarchy may include an identifier (such as an identifier usable to identify a partner's operations location, a partner, a business unit, or a group) along with a branding-related UI elements and UI content such as one or more color themes, content file paths, domain Uniform Resource Locators (URL(s)), privacy policy versions, and logo file paths corresponding to the partner or group represented by that node. When a user logs into the service provider's application, based on an ABL associated with the user's account information, an appropriate partner-specific, or partner location-specific, configuration stored in the hierarchical repository is passed via an API layer to a presentation service that presents, or renders, a user-facing UI rendering. Specifically, the presentation service transmits instructions to the user device on what to render and how to render on the device screen to render the partner's branding-specific UI.

The illustrative embodiments enable simplified onboarding and modification of partner information that serves to render the consuming applications, such as Partner Card Servicing Portal, Online Banking, Partner Mobile Apps, and more, with the correct customized partner configuration and branding elements. The hierarchical repository serves as a secure enterprise centralized repository in which the partner information can be modified simultaneously while the partner information is in use on a user device. The illustrative embodiments provide ways of dynamically modifying the data for UI rendering while the data is cached and used to render the UI on one or more target devices, to cause a change in the UI rendering at the next cache load or refresh without modifying the code of the UI. This can result in a more resource-efficient way of managing many different partner configurations.

The root-leaf, or parent-child, hierarchy of the partner information repository of the illustrative embodiments advantageously improves a UI rendering technology by reducing a load time for the UI configuration data. While the UI is constructed from either the leaf node, the entire set of nodes from the root to the leaf, or some subset thereof, the improvement in the speed of data loading, and consequently the speed of UI rendering from that data, can come from the fact that only the changed nodes in that branch of the hierarchy may have to be reloaded or refreshed in the cache to effect a change in the UI rendering based on dynamically changing partner configuration.

One type of existing tools for modifying an aspect of the UI, an aspect of the UX, or both, generally uses key-value pairs that are be created or modified in an Extensible Markup Language (XML) file to represent a change in a partner configuration. The file then is be pushed to a server for publication to the app instances. Another type of existing tools for modifying an aspect of the UI, an aspect of the UX, or both, generally uses a portal where the change data is collected, a human manually transfers the change data into a staging environment and from there either the key-value method or a manual method is employed to enable a change in the UI-UX via a scheduled release. The illustrative embodiments disclosed herein provide distinct technological advantages relative to these traditional approaches in the speed of updating the UI and UX of an app over the existing tools such that the changes occurring dynamically with partner configurations are made in the hierarchical repository's partner-management interface and published simultaneously on the repository's user-facing interface, the speed being limited only by the time-period set for cache expiry and refresh. The time-period for cache expiry and refresh is configurable to as small a time duration as needed or as large as may be appropriate for an acceptable UX.

Furthermore, the hierarchical repository of the illustrative embodiments improves the existing technology for managing different user experiences for different partners using the same end-user app, the hierarchy allows for addition, customization, or removal of data fields at a node level corresponding to a partner regardless of the node configuration of another partner or at a node higher up in the branch of the hierarchy. Thus, a partner's UI used by one user can contain more, less, or different data fields, UI artifacts, UX artifacts, or some combination thereof, as compared to another partner's UI used by another user, on the same app, at the same time, without requiring any code change to the app's UI code.

The illustrative embodiments describe a loosely coupled API/Microservice Architecture. The illustrative embodiments provide microservice-level push-based configuration without the need for a code redeployment. Data API built on a caching layer, rather than directly using the partner configuration repository. The cache is used to temporarily store the responses to user requests-including the UI elements and UI content used to render a response—so that if during the validity lifetime of the cache another request has the same input parameter of ABL the response—including at least some of the UI elements and UI content—is obtained from the cache. The loosely coupled microservices architecture of the illustrative embodiments provides multi-platform support for a variety of user devices and can be deployed to bring platform-agnostic UI-UX flexibility to other features beyond partner configuration in a similar manner.

In one example use-case of an illustrative embodiment, assume that a user logs in to a service provider's app. Based on the login, an embodiment extracts the ABL associated with that sign-on process. Once the user is authenticated, we have an API that pulls the location code. The ABL code corresponds to a partner entity's operations unit that initiated the account and is, in a way, where the account is considered to be located. Based on the ABL, an embodiment retrieves the UI elements and UI content attributes pertaining to that partner's preferences for that ABL, and perform the UI configuration. The UI elements and UI content attributes of the partner configuration are cached in cache memory (as distinct from the repository of the partner configuration) for a cache validity period. During the cache validity period, if another login from any user resolves to the same ABL, the partner configuration is retrieved from the cache and used for rendering the UI in response to the new login. If the partner configuration changes in the repository during the cache validity period, the next cache refresh will pick up the changes from the repository and all appropriate logins that resolve to an affected ABL will be updated.

Figure 1:
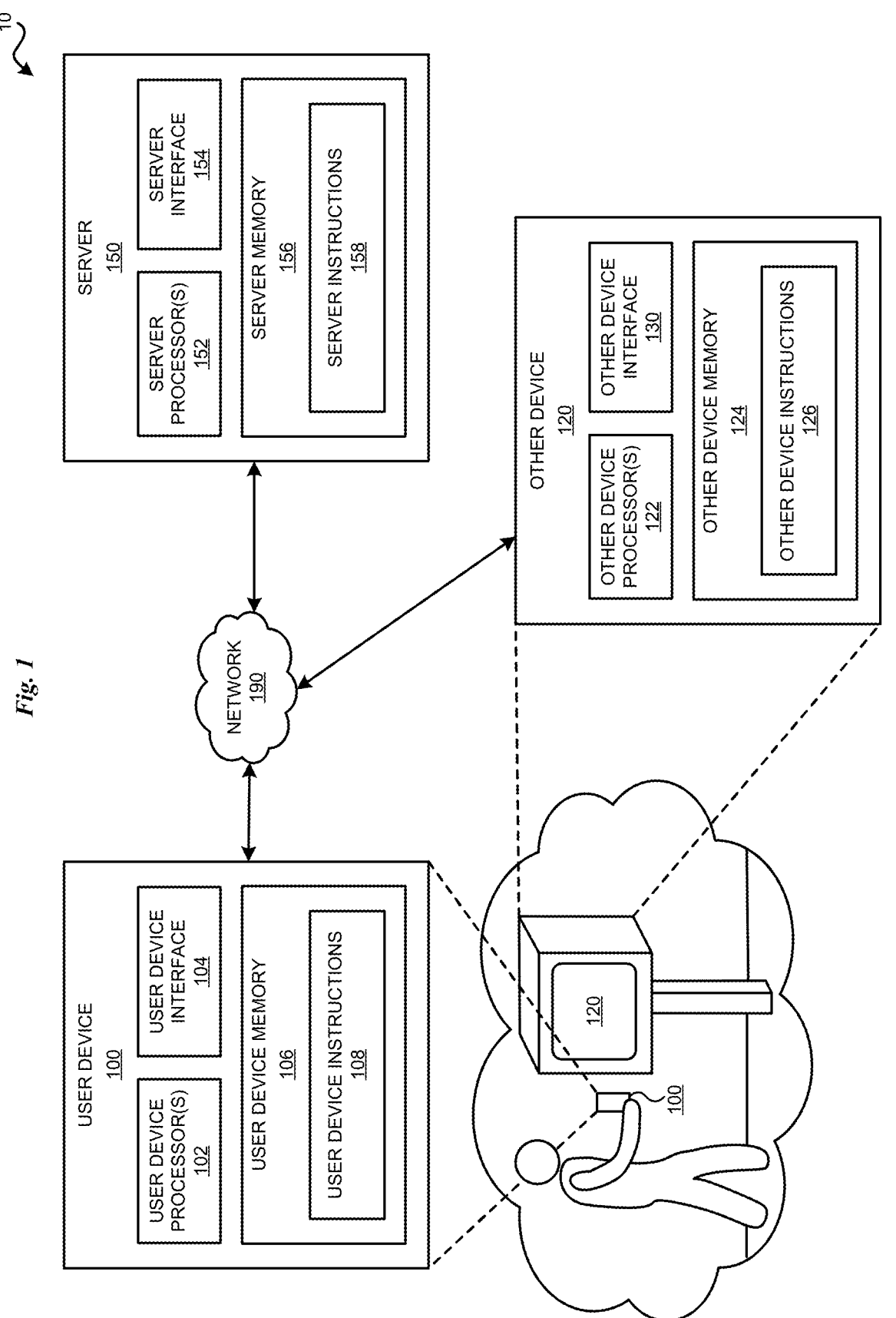
FIG. 1 depicts a block diagram of a computing environment in which an illustrative embodiment may be implemented.

FIG. 1 depicts a block diagram of a computing environment in which an illustrative embodiment may be implemented. The computing environment, labeled and referred to as system 10, includes user device 100, other device 120, and server 170 connected to a network. System 10 is configured to load and execute at least some of the computer code involved in performing the inventive methods, such as server instructions 158, which include the server-side computer program instructions of an embodiment, user device instructions 108, which include the user device-side computer program instructions of an embodiment, and other device instructions 126, which include the other device-side computer program instructions of an embodiment, as may be needed to perform the dynamic adaptation of identity related user interface.

User device 100 is a device used by a user that can be used as part of processes described herein. User device 100 can include one or more aspects described elsewhere herein such as in reference to computing environment 1100 of FIG. 11. In many examples, user device 100 is a personal computing device, such as a smart phone, tablet, laptop computer, or desktop computer. But device 100 need not be so limited and may instead encompass other devices used by a user as part of processes described herein. In the illustrated example, user device 100 can include one or more user device processors 102, one or more user device interfaces 104, and user device memory 106, among other components.

The one or more user device processors 102 are one or more components of user device 100 that execute instructions, such as instructions that obtain data, process the data, and provide output based on the processing. The one or more user device processors 102 can include one or more aspects described below in relation to the one or more processors 1112 of FIG. 11.

The one or more user device interfaces 104 are one or more components of user device 100 that facilitate receiving input from and providing output to something external to user device 100. The one or more user device interfaces 104 can include one or more aspects described below in relation to the one or more interfaces 1118 of FIG. 11.

User device memory 106 is a collection of one or more components of user device 100 configured to store instructions and data for later retrieval and use. User device memory 106 can include one or more aspects described below in relation to memory 1114 of FIG. 11. As illustrated, user device memory 106 stores user device instructions 108 and other suitable user device code.

User device instructions 108 are a set of instructions that, when executed by one or more of the one or more user device processors 102, cause the one or more user device processors 102 to perform an operation described herein. In examples, instructions 108 can be those of a mobile application (e.g., that may be obtained from a mobile application store, such as the APPLE APP STORE or the GOOGLE PLAY STORE). The mobile application can provide a user interface for receiving user input from a user and acting in response thereto. User interface 104 can further provide output to the user. In some examples, client instructions 108 are instructions that cause a web browser of user device 100 to render a web page associated with a process described herein. The web page may present information to the user and be configured to receive input from the user and take actions in response thereto.

Other device 120 may be a self-service kiosk, a computer terminal, a dedicated transactions terminal-such as an electronic payment terminal, an automated customer interaction machine or device-such as an Automated Teller Machine (ATM), and the like.

In the illustrated example, other device 120 includes one or more other device processors 122, other device memory 124, and other device interface 130.

The one or more other device processors 122 are one or more components of other device 120 that execute instructions, such as instructions that obtain data, process the data, and provide output based on the processing. The one or more other device processors 122 can include one or more aspects described below in relation to the one or more processors 1112 of FIG. 11.

Other device memory 124 is a collection of one or more components of other device 120 configured to store instructions and data for later retrieval and use. Other device memory 120 can include one or more aspects described below in relation to memory 1114 of FIG. 11. Other device memory 120 can store other device instructions 126.

Other device instructions 126 are instructions that, when executed by the one or more processors 122, cause the one or more processors 122 to perform one or more operations described elsewhere herein.

The one or more other device interfaces 130 are one or more components of other device 120 that facilitate receiving input from and providing output to something external to other device 120. The one or more other device interfaces 130 can include one or more aspects described below in relation to the one or more interfaces 1118 of FIG. 11.

Server 150 is a server device that functions as part of one or more processes described herein. In the illustrated example, server 150 includes one or more server processors 152, one or more server interfaces 154, and server memory 150, among other components.

The one or more server processors 152 are one or more components of server 150 that execute instructions, such as instructions that obtain data, process the data, and provide output based on the processing. The one or more server processors 152 can include one or more aspects described below in relation to the one or more processors 1112 of FIG. 11.

The one or more server interfaces 154 are one or more components of server 150 that facilitate receiving input from and providing output to something external to server 150. The one or more server interfaces 154 can include one or more aspects described below in relation to the one or more interfaces 1118 of FIG. 11.

Server memory 150 is a collection of one or more components of server 150 configured to store instructions and data for later retrieval and use. Server memory 150 can include one or more aspects described below in relation to memory 1114 of FIG. 11. Server memory 150 can store server instructions 158.

Server instructions 158 are instructions that, when executed by the one or more processors 152, cause the one or more processors 152 to perform one or more operations described elsewhere herein.

Network 190 is a set of devices that facilitate communication from a sender to a destination, such as by implementing communication protocols. Example networks 190 include local area networks, wide area networks, intranets, and the Internet.

Figure 2:
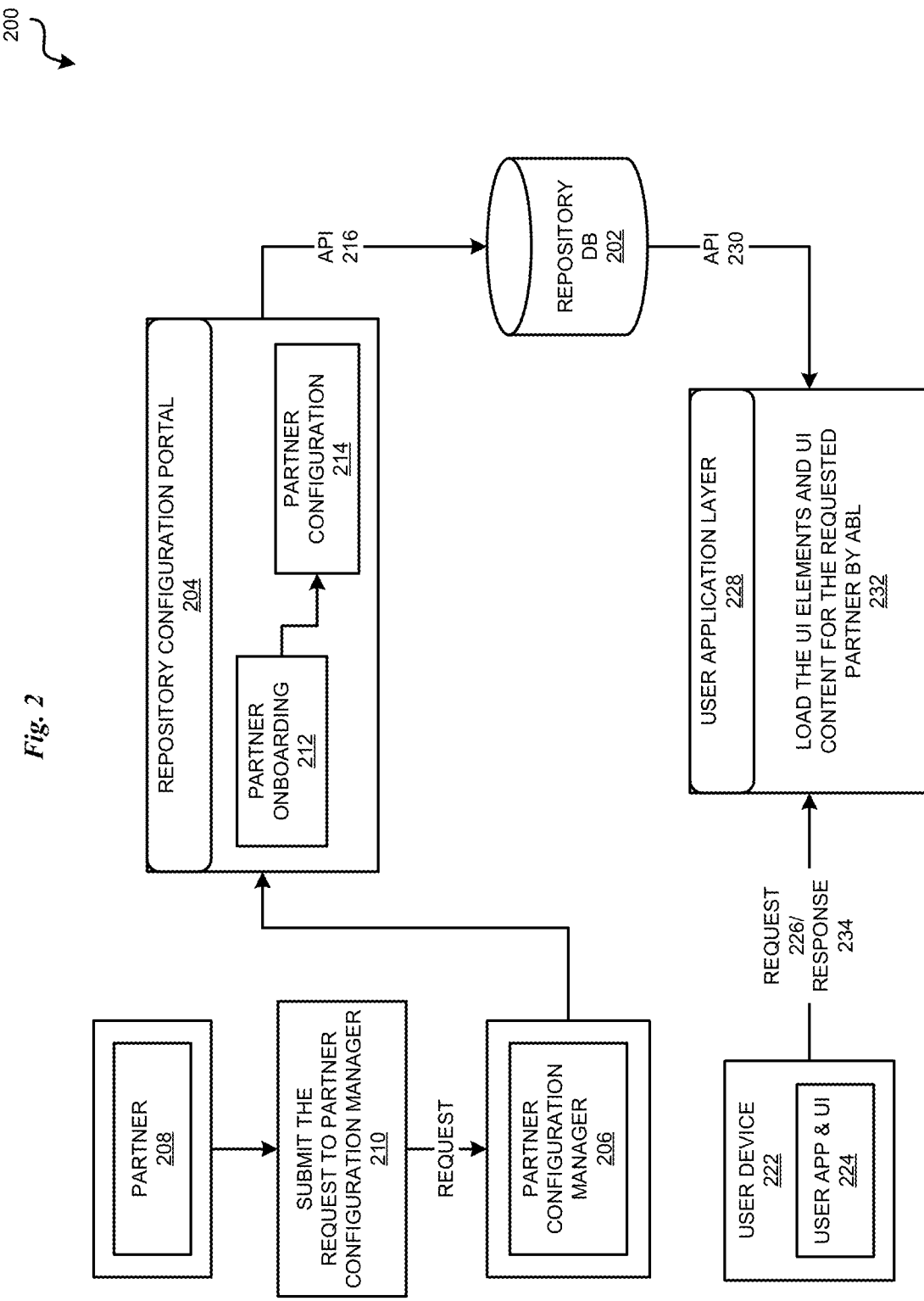
FIG. 2 depicts a flow chart of an example process for dynamic adaptation of identity related user interface in accordance with an illustrative embodiment.

FIG. 2 depicts a flow chart of an example process for dynamic adaptation of identity related user interface in accordance with an illustrative embodiment. Process 200 can be implemented using system 10 of FIG. 1. Repository 202 is a hierarchical repository as described herein. Repository 202 is configured to add, store, modify, and delete data structures in the form of objects or nodes that include UI elements, UI content, or both as relates to partner locations, partners, partner groups at various levels, and the service provider.

Repository configuration portal 204 allows a partner-facing person, for example, partner configuration manager 206, to manipulate the data hierarchy in repository 202. In one example operation, partner 208 submits request 210 to partner configuration manager 206. Partner configuration manager 206, uses partner onboarding function 212 in portal 204 to perform partner configuration function 214. Portal 204 performs partner configuration function 214 by using API 216 to add, store, modify, and delete data structures in the form of objects or nodes that include UI elements, UI content, or both as relates to partner or the partner's location, as the case in request 210 may be.

A user uses user device 222 on which a user application provided by the service provider presents UI 224. The user application requests account access for the user via a login request 226. Application layer 228 receives request 226 and determines an ABL for the account associated with the user. Using API 230, application layer 228 loads the ABL-appropriate UI elements and UI content 232 from repository 202 (assuming that data is unavailable in a cache (not shown)). Application layer 228 sends response 234 to user application 224. Response 234 contains rendering instructions, rendering data, or both, causing user application 224 to render a partner-specific branding-related UI to the user.

Figure 3:
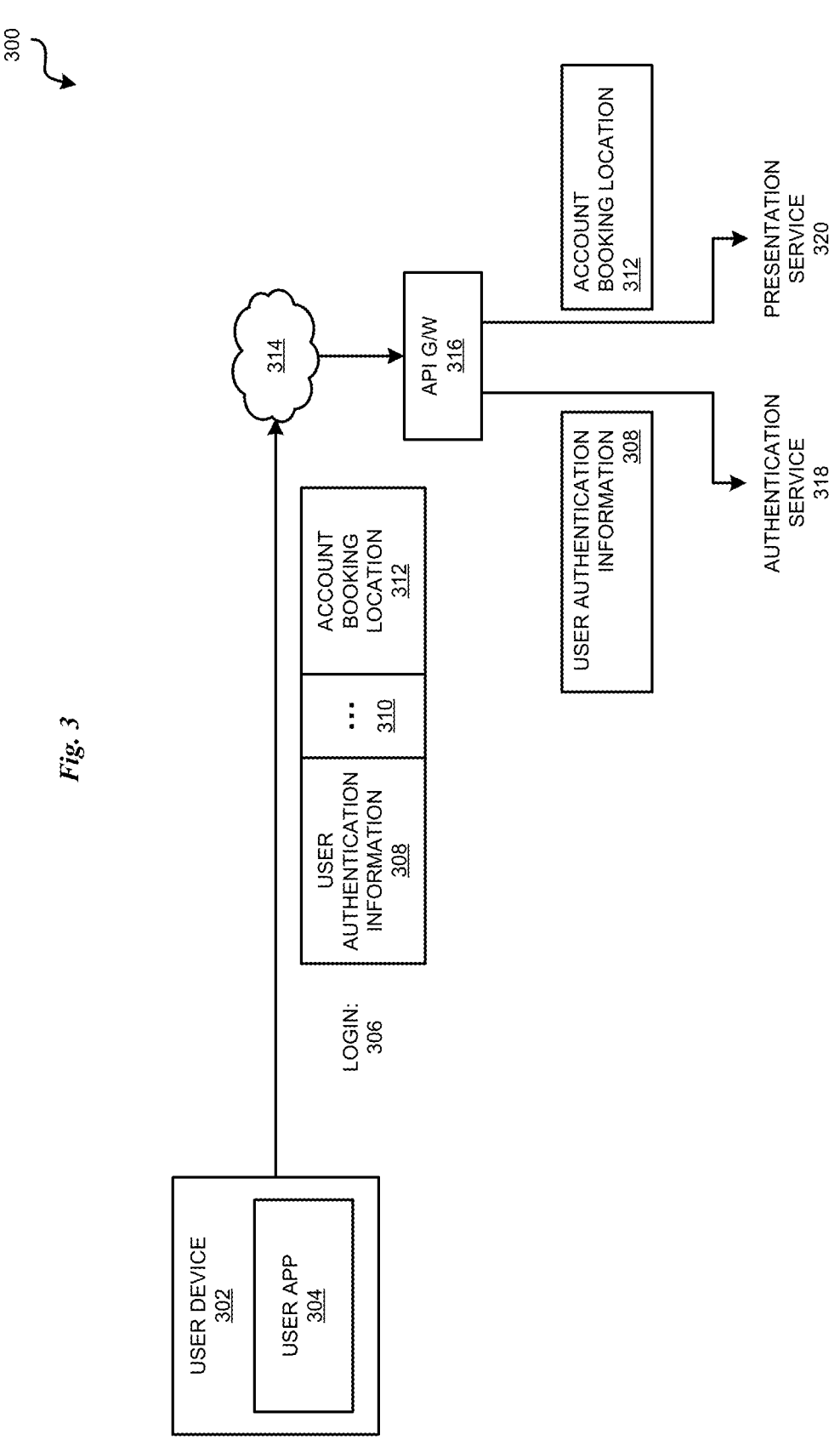
FIG. 3 depicts a block diagram of an example process for selecting ABL-based partner-specific UI features for dynamic adaptation of identity related user interface in accordance with an illustrative embodiment.

FIG. 3 depicts a block diagram of an example process for selecting ABL-based partner-specific UI features for dynamic adaptation of identity related user interface in accordance with an illustrative embodiment. In process 300, user device 302 is an example of user device 222 in FIG. 2 and user app 304 is an example of user app 224 in FIG. 2.

In this example process according to one embodiment, login 306 is a part of a request, such as request 226 in FIG. 2. Login 306 includes, other than user authentication information 308, other optional data 310, and ABL 312. Login request 306 reaches service provider network 314, which routes login request 306 to API gateway 316. Gateway 316 sends user authentication information 308 to authentication service 318, and ABL 312 to presentation service 320. As an example, presentation service 320 may include or operate in conjunction with application layer 228 in FIG. 2 to cause the selection, retrieval, and sending of ABL-appropriate UI elements and UI content as described herein.

Figure 4:
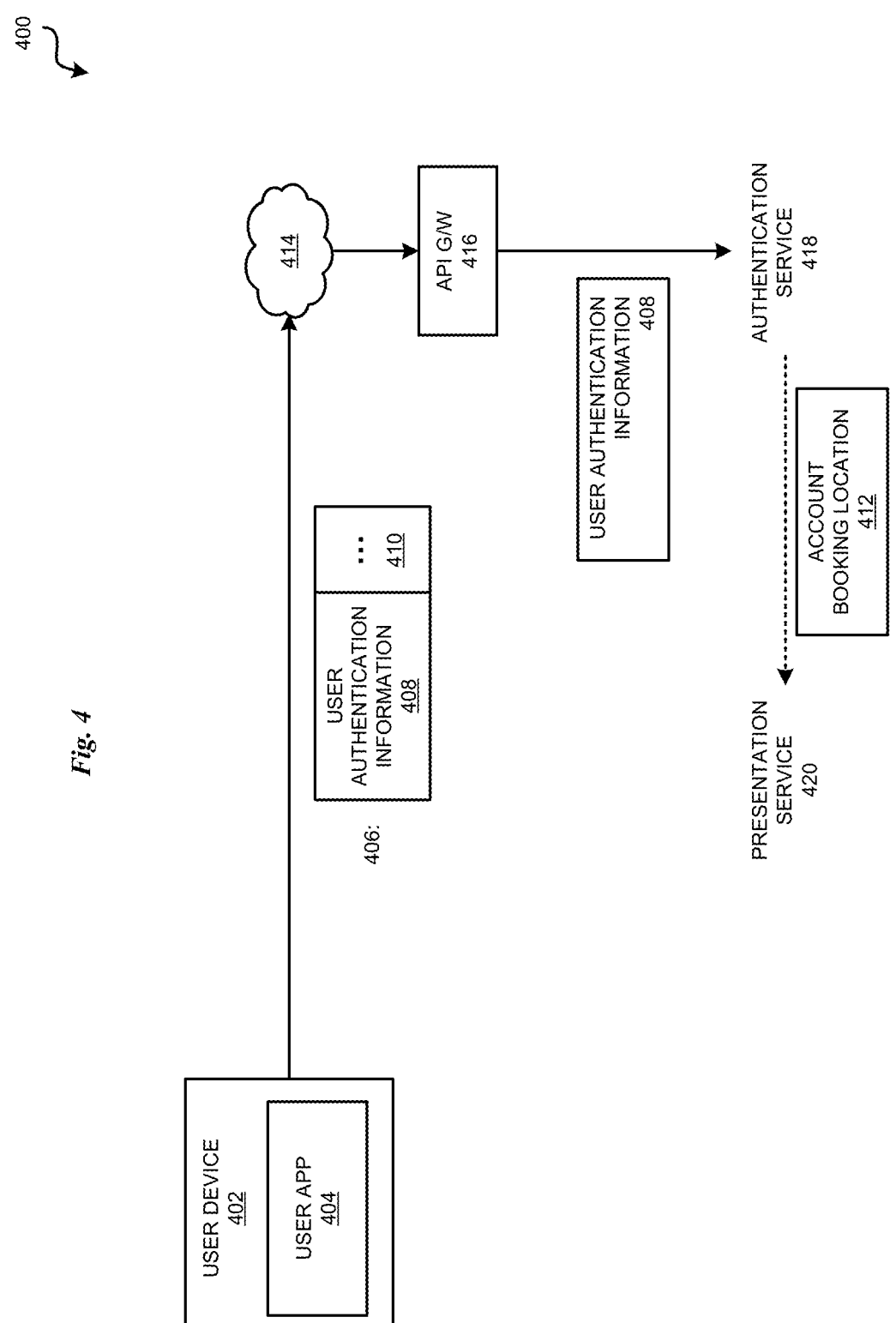
FIG. 4 depicts a block diagram of another example process for selecting ABL-based partner-specific UI features

FIG. 4 depicts a block diagram of another example process for selecting ABL-based partner-specific UI features for dynamic adaptation of identity related user interface in accordance with an illustrative embodiment. In process 400, user device 402 is an example of user device 222 in FIG. 2 and user app 404 is an example of user app 224 in FIG. 2.

In this example process according to another embodiment, login 406 is a part of a request, such as request 226 in FIG. 2. Login 406 includes user authentication information 408 and other optional data 410 but does not include the ABL. Login request 406 reaches service provider network 414, which routes login request 406 to API gateway 416. Gateway 416 sends user authentication information 408 to authentication service 418. Authentication service 418 is configured to determine from server-side data of the user and user accounts, ABL 412 that is associated with login credentials 406. Authentication service 418 sends ABL 412 to presentation service 420. As an example, presentation service 420 may include or operate in conjunction with application layer 228 in FIG. 2 to cause the selection, retrieval, and sending of ABL-appropriate UI elements and UI content as described herein.

FIG. 5 depicts a block diagram of an ABL identification process in an example implementation of an illustrative embodiment. Assume that process 500 depicts a hierarchical setup of a major servicer financial institution in which the hierarchy includes level 602 which includes multiple credit card issuers business units, for example, Issuer 1 having 128453 as ABL, Issuer 2 having 128454 as ABL, and Issuer 3 having 887467 as ABL. Similarly, at level 504 in the hierarchy are portfolio business units, or partner entities, which have the same parent car issuer-Issuer 2. At level 504, Partner 1 has ABL 888017 and Partner 2 has ABL 505084. If any partner had sub business units, they would show up in the hierarchy at level 506, but in this non-limiting example, neither Partner 1 nor Partner 2 have any sub business units.

At level 508 the ABLs of the partner locations are stored. Accordingly Partner 1 has one web or physical location associated with ABL 24193 and Partner 2 has one web or physical location associated with ABL 7987.

Note that if a partner had sub business units the partner could have multiple ABLs in that some or all sub business unit of the partner could have one or more ABLs. Furthermore, if a sub business unit had a sub sub-business unit, there could be additional layers in the hierarchy to represent them. Different issuers, partners, or their subsidiaries could have different depths of levels based on the organizational structure. These examples of levels are not intended to be limiting. From this disclosure, those of ordinary skill in the art will be able to conceive many other levels and organizations of the hierarchy and the same are contemplated within the scope of the illustrative embodiments.

FIG. 6 depicts a block diagram of an overall process flow for dynamic adaptation of identity related user interface in accordance with an illustrative embodiment. At least some parts of process 600 can be implemented using system 10 of FIG. 1.

In an example configuration for example process 600, client browser 602 operates on a user device, such as user device 302 or 402 in FIG. 3 or FIG. 4, respectively, as the user app and presents the UI as described herein. Block 604 represents the service provider's computing environment. The blocks representing systems, functions, and data communications within block 604 occur on the server-side of the service provider's network, for example, on the server-side of networks 314 and 414 in FIGS. 3 and 4, respectively.

Block 606 represents a partner's computing environment and encompasses systems, functions, and data communications that occur on the partner's systems.

In an example operation, the user uses page 608 browser 602 to request access to partner services from the service provider. Page 608 sends login request A to API gateway 610. Gateway 610 sends all or part of request A as request B to component 612, which formulates and sends query C (in GraphQL query language, shown only as a non-limiting example) to layer 614 of services. Component 612 may provide response B', such as an error or acknowledgment to gateway 610. Layer 614 may provide response C', such as an error or acknowledgment to gateway component 612.

Microservice 1 is an example of a service provided from layer 614, and may be an example of any of authentication service 318 or 418 or presentation service 320 or 420 in FIG. 3 or 4, respectively, or some combination thereof. Layer 614 pulls (D) ABL-specific partner configuration data from repository 616 as needed (e.g., when partner configuration data is unavailable or stale in cache 618. A service, e.g., Microservice 1, in layer 614 pushes (E) the ABL-specific partner configuration data to cache 618. Cache 618 refreshes (E') the data using service layer 614 at cache expiry or when data changes in repository 616.

As a consequence of request A, gateway 610 invokes API 620 to read the partner configuration data. API 620 sends read request G to cache 618 and receives the requested data as response G'. API 620 provides the data in response F' to gateway 610, which returns the partner-specific data to browser 602 as response A' upon successful login.

Browser 602 navigates to page 622 as a result of response A'. During the user interactions on page 622, browser 602 may send another request H, which may have to be processed by the provider. Accordingly, gateway 610 routes request H as request I to provider system 624. System 624 might be one or more data processing systems on which a variety of applications and services might be executing, as shown by example. An appropriate application or service from system 624 provides response I' to gateway 610, which in turn provides a corresponding response H' to browser 602.

Browser 602 may be able to request data or a transaction directly with provider environment 606. Request J is an example of such a request and responses J' and J" are possible examples of responses from one or more applications or services within environment 606, depending on the nature of request J.

Similarly, Browser 602 may be able to request data or a transaction directly with an application or service within service provider's environment 604. Request K is an example of such a request and response K' is an examples of a response from one or more applications or services within environment 604, depending on the nature of request K.

On the partner-facing side of repository 616, repository UI 626 is a UI presented by the partner configuration portal described earlier. UI 626 allows a partner configuration manager to perform partner onboarding and configuration function 628. API gateway or proxy 630 (same or different from gateway 610) uses component (same or different from component 612), to send queries or request to API 634 for performing partner configuration additions, updates, or deletions, as the case may be, on repository 616.

FIG. 7 depicts another view of an overall process for dynamic adaptation of identity related user interface in accordance with an illustrative embodiment. Artifacts in FIG. 7 correspond to similar artifacts described with respect to other figures earlier.

Partner configuration manager 702 uses partner configuration portal 704 for partner onboarding function 706 or partner configuration function 708. Component 710 authenticates partner configuration manager 702's access to the system, such as by using directory server 712, and provides authorization 714 when successful. Partner configuration portal 704 uses services 716 and 718 via API 720 to perform the partner onboarding and partner configuration operations on repository 722.

User device 724 presents user app and UI 726 for a user to access user application 728. User application 728 uses service 732 to access either cache 734 or repository 722 for loading the UI elements and UI content for the requested partner by ABL (730) as described earlier.

FIG. 8A depicts one part of a workflow in a service provider environment in accordance with an illustrative embodiment. Workflow 800 depicts a submitter flow where a partner configuration has to be submitted anew for onboarding or modified or removed for partner management. Workflow 802 is for modification or rejection/deletion of a partner configuration in repository 826. Workflow 804 is for adding a new partner's configuration or updating an existing configuration.

Workflow 804 determines whether the request is for adding a new partner configuration or editing an existing partner's configuration (block 806). If adding a new configuration ("New" path of block 806), the workflow proceeds to invoke the repository's "add a partner" feature is invoked (block 812). If modifying an existing configuration ("Existing" path of block 806), the workflow extracts the partner configuration from the repository (block 808), and edits the configuration (block 810).

Workflow 802, block 810, and block 812 then proceed to the next step for an approval of the changed data (block 814). The approval process selects an approver or publisher (block 816). The approver pulls up the modified or added data on a review screen (block 818) and triggers a workflow for repository update (block 820). The workflow (block 822) invokes the database API (block 824), which updates repository 826 with the new approved configuration or the modified configuration.

FIG. 8B depicts another part of a workflow in a service provider environment in accordance with an illustrative embodiment. Workflow 801 depicts an approver workflow for approving additions and changes to partner configurations and a publisher workflow for recording the new or changed configurations in repository 826.

The approver workflow 830 begins with an approval screen showing the present state of configuration (if any) and the new state of the configuration to be recorded (block 814). The approver pulls up the modified or added data on a review screen (block 818) and triggers a workflow for repository update (block 820). The repository workflow (block 822) invokes the database API (block 824), which updates repository 826 with the new approved configuration or the modified configuration.

The publisher workflow 840 begins with the modified or added data on a review screen (block 818) and triggers a workflow for repository update (block 820). If a modified configuration is to be recorded in the repository, the repository workflow (block 822) invokes the database API (block 824), which updates repository 826 with the modified configuration. If a new configuration is to be added and the repository workflow is a success ("Success" path of block 846), workflow 822 invokes a master record creation function (block 850), which invokes the database API (block 824), which updates repository 826 with the new approved configuration or the modified configuration. If a new configuration is to be added and the repository workflow fails ("Failure" path of block 846), workflow 822 sends an error to block 820.

FIG. 9 depicts a flowchart of an ABL-based dynamic adaptation of identity related user interface in accordance with an illustrative embodiment. Process 900 begins with receiving a user login request (block 902). The process determines an ABL for the account associated with the user login (block 904). The process selects a set of UI elements and UI content corresponding to the ABL (block 906). The process sends the selected UI elements and content for rendering to a presentation service (block 908). The process ends thereafter.

As a part of selecting the UI elements and content at block 906, the process locates the top level elements and content in a branch of a hierarchy corresponding to the ABL (block 910). The process traverses the branch from the root to the node representing the ABL (block 912). The process collects all the elements and content during the traversal to form the set of UI elements and UI content to send for rendering (block 914). The illustrative embodiments contemplate that some elements and content of one node may be replaced, removed, or overwritten by the elements and content of another node in the branch during the traversal, and only the final state of a UI element or content is sent for rendering.

FIG. 10 depicts a flowchart of a process for reusing UI elements and components for different users in accordance with an illustrative embodiment. The different users may be geographically located in the same or different locations however, the reuse is based on whether they share the ABL.

Process 1000 begins by presenting a UI based on a first user's ABL (block 1002). The process receives a second login request from a second user (block 1004). The process determines whether the second user is associated with the same ABL as the first user (block 1006). If the two users are associated with different ABLs ("No" path of block 1006), the process exits process 1000 at exit point marked A and enters process 900 at the corresponding entry point marked A.

If the two users are associated with the same ABLs ("Yes" path of block 1006), the process determines whether the cache is still valid for the UI elements and content related to the ABL (block 1008). If the cache has not expired or is not valid for some reason ("No" path of block 1008), the process exits process 1000 at exit point marked B and enters process 900 at the corresponding entry point marked B. If the cache is valid ("Yes" path of block 1008), the process presents the UI using the cached UI elements for the ABL to the second user (block 1010). The process ends thereafter.

FIG. 11 depicts a data processing environment 20 in which aspects of the present disclosure may be implemented. Computing environment 1100 is a set of one or more virtual or physical computers 1110 that individually or in cooperation achieve tasks, such as implementing one or more aspects described herein. Computers 1110 have components that cooperate to cause output based on input. Example computers 1110 include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, computing environment 1100 includes at least one physical computer.

Computing environment 1100 may specifically be used to implement one or more aspects described herein. In some examples, one or more of computers 1110 may be implemented as a user device, such as mobile device and others of computers 1110 may be used to implement aspects of a machine learning framework useable to train and deploy models exposed to the mobile device or provide other functionality, such as through exposed application programming interfaces.

Computing environment 1100 can be arranged in any of a variety of ways. Computers 1110 can be local to or remote from other computers 1110 of environment 1100. Computing environment 1100 can include computers 1110 arranged according to client-server models, peer-to-peer models, edge computing models, other models, or combinations thereof.

In many examples, computers 1110 are communicatively coupled with devices internal or external to computing environment 1100 via network 1102. Network 1102 is a set of devices that facilitate communication from a sender to a destination, such as by implementing communication protocols. Example networks 1102 include local area networks, wide area networks, intranets, or the Internet.

In some implementations, computers 1110 can be general-purpose computing devices (e.g., consumer computing devices). In some instances, via hardware or software configuration, computers 1110 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 1110 include one or more processors 1112, memory 1114, and one or more interfaces 1118. Such components can be virtual, physical, or combinations thereof.

The one or more processors 1112 are components that execute instructions, such as instructions that obtain data, process the data, and provide output based on the processing. The one or more processors 1112 often obtain instructions and data stored in memory 1114. The one or more processors 1112 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 1112 include at least one physical processor implemented as an electrical circuit. Example providers of processors 1112 include INTEL, AMD, QUALCOMM, TEXAS INSTRUMENTS, and APPLE.

Memory 1114 is a collection of components configured to store instructions 1116 and data for later retrieval and use. Instructions 1116 can, when executed by the one or more processors 1112, cause execution of one or more operations that implement aspects described herein. In many examples, memory 1114 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, transitory memory 1114 can store information encoded in transient signals.

The one or more interfaces 1118 are components that facilitate receiving input from and providing output to something external to computer 1110, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 1118 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 1118 can facilitate connection of computing environment 1100 to network 1190.

Computers 1110 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

In addition to the depicted components of system 10 in FIG. 1, system 10 can also include many other components including, but not limited to—a public cloud, a private cloud, a gateway, a cloud orchestration module, a computer (which may further include specialized processing circuitry, cache, a communication fabric, a volatile memory, a persistent storage including an operating system, and peripheral devices), Internet of Things (IOT) sensors, a remote database, and a container set.

A device contemplated herein may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database. As is well understood in the art of computer technology, and depending upon the technology, performance of a computer-implemented method may be distributed among multiple computers and/or between multiple locations. Where the detailed discussion in this disclosure is focused on a single computer, such focus is only to keep the presentation as simple as possible. A computer or device contemplated herein may be located in or participate in a cloud, even though it is not shown in a cloud. On the other hand, a computer or device is not required to participate in a cloud except to any extent as may be affirmatively indicated.

A processor device described herein may be of any type now known or to be developed in the future, may be distributed over multiple packages or coordinated integrated circuit chips, and may implement multiple processor threads and/or multiple processor cores. Cache memory may be located in the processor chip package(s) and is typically used for data or code that should be available for rapid access by the threads or cores running on a processor. Cache memories are typically organized into multiple levels depending upon relative proximity to the processing circuitry. Alternatively, some, or all, of the cache for the processor set may be located "off chip." In some computing environments, a processor may be designed for working with qubits and performing quantum computing.

Computer readable program instructions are typically loaded onto a computing device to cause a series of operational steps to be performed by a processor set of the computing device and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache and the other storage media discussed below. The program instructions, and associated data, are accessed by the processor set to control and direct performance of the inventive methods. At least some of the instructions for performing the inventive methods may be stored in a persistent storage.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the embodiments. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment, either locally at a data processing system or over a data network, within the scope of the illustrative embodiments. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment within the scope of the illustrative embodiments. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one"

and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments each have been described by stating their individual advantages, respectively, present application is not limited to a particular combination thereof. To the contrary, such embodiments may also be combined in any way and number according to the intended deployment of present embodiments without losing their beneficial effects.

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method comprising:
computing an Account Booking Location (ABL) from a login request to access an account of a first user, wherein the ABL comprises an identifier assigned to an asset of a partner entity, the identifier corresponding to a location of a site where the partner entity first created the account, and where the account is considered to be located;
pushing from a repository to a cache to form cached data, on demand for a User Interface (UI) rendering responsive to the request, a UI element corresponding to the ABL;
causing, responsive to the pushing, a rendering service to compose a rendering instruction using the cached data such that the rendering instruction causes a first brand-specific UI to be rendered on a device associated with the first user; and
reusing, responsive to a second login request from a second user wherein the second login request also corresponds to the ABL, the cached data to compose a second rendering instruction such that the second rendering instruction causes the first brand-specific UI to be rendered on a second device associated with the second user.

2. The computer-implemented method of claim 1, wherein the first user and the second user are physically located in different locations.

3. The computer-implemented method of claim 1, wherein the reusing further comprises: determining that the cached data is within a cache expiry period.

4. The computer-implemented method of claim 1, wherein the login request and the second login request originate from different types of computing platforms.

5. The computer-implemented method of claim 1, wherein the first brand-specific UI is consistent with (i) a first brand of the partner with which a user interaction of the first user has to occur, and (ii) an account information of the user relative to the first brand of the partner.

6. The computer-implemented method of claim 1, further comprising:
further pushing from the repository to the cache, a UI content corresponding to the ABL.

7. The computer-implemented method of claim 1, wherein the ABL comprises a code corresponding to the location.

8. The computer-implemented method of claim 1, wherein the ABL comprises a portion of a name of the location.

9. The computer-implemented method of claim 1, further comprising:
extracting, as a part of the computing, the ABL data from the login request data structure.

10. The computer-implemented method of claim 1, further comprising:
retrieving the ABL, from a server-side application, by validating a login credential in the login request, using the login credential in the server-side application to find a corresponding ABL data, and using the corresponding ABL data as the ABL.

11. The computer-implemented method of claim 1, further comprising:

configuring the repository with a hierarchy of a set of UI elements.

12. The computer-implemented method of claim 11, wherein a first subset of UI elements is global and applies to a set of branded UI renderings, wherein a second subset of elements is unique to a subset of the set of branded UI renderings, and wherein a third subset of elements is unique to a singular branded UI rendering in the set of branded UI renderings.

13. The computer-implemented method of claim 12, wherein the pushing further comprises:

pushing a combination of UI elements, wherein the combination comprises at least one UI elements from the first subset, and at least one UI element from one of the second subset and the third subset.

14. The computer-implemented method of claim 12, wherein the pushing further comprises:

pushing a combination of UI elements, wherein the combination comprises at least one UI elements from the first subset, and at least one UI element from the second subset, and at least one UI element from the third subset.

15. The computer-implemented method of claim 11, wherein the set of UI elements in the hierarchy further comprises a UI content from the third subset.

16. The computer-implemented method of claim 11, further comprising:

changing a node in the hierarchy while a UI element from the node is deployed to the one or more user screens.

17. A computer program product comprising one or more non-transitory computer readable storage media, and program instructions collectively stored on the one or more computer readable storage media, the program instructions executable by a set of one or more processors to cause the set of one or more processors to perform operations comprising:

computing an Account Booking Location (ABL) from a login request to access an account of a first user, wherein the ABL comprises an identifier assigned to an asset of a partner entity, the identifier corresponding to a location of a site where the partner entity first created the account, and where the account is considered to be located;

pushing from a repository to a cache to form cached data, on demand for a User Interface (UI) rendering responsive to the request, a UI element corresponding to the ABL;

causing, responsive to the pushing, a rendering service to compose a rendering instruction using the cached data such that the rendering instruction causes a first brand-specific UI to be rendered on a device associated with the first user; and reusing, responsive to a second login request from a second user wherein the second login request also corresponds to the ABL, the cached data to compose a second rendering instruction such that the second rendering instruction causes the first brand-specific UI to be rendered on a second device associated with the second user.

18. The computer program product of claim 17, wherein the stored program instructions are stored in a computer readable storage device in a data processing system, and wherein the stored program instructions are transferred over a network from a remote data processing system.

19. The computer program product of claim 17, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

20. A computer system comprising a set of one or more processors and one or more computer readable storage media, and program instructions collectively stored on the one or more computer readable storage media, the program instructions executable by the set of one or more processors to cause the processor to perform operations comprising:

computing an Account Booking Location (ABL) from a login request to access an account of a first user, wherein the ABL comprises an identifier assigned to an asset of a partner entity, the identifier corresponding to a location of a site where the partner entity first created the account, and where the account is considered to be located;

pushing from a repository to a cache to form cached data, on demand for a User Interface (UI) rendering responsive to the request, a UI element corresponding to the ABL;

causing, responsive to the pushing, a rendering service to compose a rendering instruction using the cached data such that the rendering instruction causes a first brand-specific UI to be rendered on a device associated with the first user; and reusing, responsive to a second login request from a second user wherein the second login request also corresponds to the ABL, the cached data to compose a second rendering instruction such that the second rendering instruction causes the first brand-specific UI to be rendered on a second device associated with the second user.

* * * * *